(12) United States Patent
Kuroda et al.

(10) Patent No.: US 9,138,923 B2
(45) Date of Patent: Sep. 22, 2015

(54) VERTICAL INJECTION MOLDING MACHINE

(71) Applicant: TOYO MACHINERY & METAL CO., LTD., Akashi-shi, Hyogo (JP)

(72) Inventors: Hiromichi Kuroda, Akashi (JP); Akihiro Kuroda, Akashi (JP)

(73) Assignee: TOYO MACHINERY & METAL CO., LTD., Hyogo (JP)

( * ) Notice: Subject to any disclaimer, the term of this patent is extended or adjusted under 35 U.S.C. 154(b) by 156 days.

(21) Appl. No.: 13/965,284

(22) Filed: Aug. 13, 2013

(65) Prior Publication Data

US 2013/0330436 A1 Dec. 12, 2013

Related U.S. Application Data

(63) Continuation of application No. PCT/JP2011/072349, filed on Sep. 29, 2011.

(30) Foreign Application Priority Data

Mar. 14, 2011 (JP) ................. 2011-055412

(51) Int. Cl.
*B29C 45/64* (2006.01)
*B29C 45/07* (2006.01)
(Continued)

(52) U.S. Cl.
CPC .............. *B29C 45/07* (2013.01); *B29C 45/401* (2013.01); *B29C 45/661* (2013.01); *B29C 45/1761* (2013.01); *B29C 45/5008* (2013.01); *B29C 45/66* (2013.01)

(58) Field of Classification Search
CPC .. B29C 45/5008; B29C 45/1761; B29C 45/66

USPC .............. 425/589, 590, 595, 556, 145
See application file for complete search history.

(56) References Cited

U.S. PATENT DOCUMENTS

5,306,136 A * 4/1994 Oomori et al. ................ 425/593
5,332,382 A * 7/1994 Kasai et al. ................... 425/145
(Continued)

FOREIGN PATENT DOCUMENTS

JP 2000-263619 A 9/2000
JP 3953395 B2 8/2007
(Continued)

OTHER PUBLICATIONS

International Search Report for PCT/JP2011/072349, Mailing Date of Dec. 20, 2011.

*Primary Examiner* — Tim Heitbrink
(74) *Attorney, Agent, or Firm* — Westerman, Hattori, Daniels & Adrian, LLP

(57) ABSTRACT

The vertical injection molding machine is provided with an electric servomotor which moves an injection drive unit up and down accompanying the rotation of a driven pulley via a ball screw mechanism, a timing belt by which the drive force of the electric servomotor is transmitted, and a driven pulley on which the timing belt is rotated, wherein an arc groove is formed on the driven pulley, and an election pin is provided which is inserted to the arc groove of the driven pulley when the timing belt is disconnected. When the election pin is inserted to the arc groove, the tip of the election pin applies pressure on an inclined portion by means of elastic force of a spring, slowing the rotational speed of the driven pulley and stopping the injection drive unit by an inner wall surface of the slowed driven pulley colliding with the ejection pin.

3 Claims, 14 Drawing Sheets

(51) Int. Cl.
*B29C 45/40* (2006.01)
*B29C 45/50* (2006.01)
*B29C 45/66* (2006.01)
*B29C 45/17* (2006.01)

(56) References Cited

U.S. PATENT DOCUMENTS

| | | | | |
|---|---|---|---|---|
| 5,393,210 | A | * | 2/1995 | Kasai et al. ............... 425/145 |
| 5,914,139 | A | * | 6/1999 | Matsubayashi et al. ...... 425/145 |
| 6,024,560 | A | * | 2/2000 | Ito et al. .................. 425/593 |
| 6,164,947 | A | * | 12/2000 | Miyahara ................. 425/136 |
| 7,008,585 | B2 | * | 3/2006 | Romanello ................. 264/155 |
| 7,082,807 | B2 | * | 8/2006 | Hoorelbeke ................. 72/345 |
| 7,131,835 | B2 | * | 11/2006 | Okazaki ................. 425/570 |
| 7,261,853 | B2 | * | 8/2007 | Sutter ................. 264/318 |
| 7,431,578 | B2 | * | 10/2008 | Kunimatsu et al. ......... 425/135 |
| 8,371,016 | B2 | * | 2/2013 | Li et al. ................. 29/525.01 |
| 8,425,221 | B2 | * | 4/2013 | Wang et al. ................. 425/556 |

FOREIGN PATENT DOCUMENTS

| | | |
|---|---|---|
| JP | 2008-105185 A | 5/2008 |
| JP | 2010-189088 A | 9/2010 |

* cited by examiner

VERTICAL INJECTION MOLDING MACHINE

This application is a continuation of International application No. PCT/JP2011/072349, filed on Sep. 29, 2011, the contents of which are incorporated herein by reference.

The present application is based on and claims priority Japanese patent application No. 2011-055412 filed on Mar. 14, 2011, the entire contents of which are hereby incorporated by reference.

BACKGROUND OF THE INVENTION

1. Field of the Invention

The present invention relates to a vertical injection molding machine for molding parts by opening and closing a mold in the vertical direction, and specifically relates to a vertical injection molding machine capable of preventing components movable in the up-down direction provided on the vertical injection molding machine from falling due to their own weight.

2. Description of the Related Art

In the prior art, a two-station vertical injection molding machine has been used where two lower molds attached to a turn table are moved by rotating the turn table respectively to a position opposing to a single upper mold to allow opening and closing of the mold, and opening and closing the mold in the vertical direction. In such vertical injection molding machine for clamping the upper mold with multiple lower molds, a fabrication method is adopted for integrally molding a metallic insert component with resin, where a metallic component used for insert molding is assembled to the lower mold arranged on the opposite side of the lower mold subjected to mold clamping during the mold clamping process for molding parts, and after the component is assembled, the turn table is rotated to a given position to subject the lower mold having the metallic component assembled thereto and the upper mold to mold clamping, wherein injection and filling of molten resin to a cavity of the clamped mold is performed by lowering an injection unit arranged above the upper mold and having an injection nozzle attached to a tip (lower end) of the injection unit to the upper mold, and in that state, injection and filling of molten resin to the mold cavity is carried out by driving an injection screw. The driving of the injection screw is performed using a drive source such as a motor via a pulley, a drive belt or the like.

Regarding the prior art technique mentioned above, patent Document 1 (Japanese Patent Laid-Open Publication No. 2008-105185) discloses a vertical injection molding machine, wherein patent document 1 provides a vertical injection molding machine having a toggle-type mold clamping device that drives a movable platen in a direction for opening and closing a mold with respect to a fixed platen using an electric motor as the drive source, wherein a driven pulley attached to a ball screw for driving the toggle-type mold clamping device is prevented from rotating inversely by having projections of a stopper engage with the teeth of the driven pulley so as to prevent the movable platen from falling.

Patent document 2 (Japanese Patent No. 3953395) discloses an art of engaging claws of a stopper with the teeth of a driven pulley having teeth so as to prevent rotation of an output shaft when power supply to an electric motor is stopped in a molded object take-out machine.

Patent document 3 (Japanese Patent Laid-Open Publication No. 2010-189088) discloses an elevator emergency brake device, wherein an elevator in a stopped state can be prevented from moving due to abnormality by having an engagement member engage with an opening formed on a sheave rotated by the up-down movement of the elevator.

The vertical injection molding machine disclosed in patent document 1 teaches an art for preventing a movable platen from falling when the timing belt is disconnected, but normally, the timing belt is not disconnected when the vertical injection molding machine is at a stopped state and often disconnected when the timing belt is rotated along with the operation of the vertical injection molding machine and a large load is applied on the timing belt, so that if the timing belt is disconnected when the driven pulley rotated around the timing belt is rotated, the attempt to speedily engage the projection on the stopper to the teeth of the driven pulley will cause the stopper to be snapped by the rotation of the driven pulley and it will not be possible to promptly prevent the movable platen from falling by the stopping of rotation, whereas patent document 2 discloses an art of reliably preventing movement of the pulley by engaging a stopper to the pulley in the stopped state when the device is stopped by shutting down power supply, but similar to patent document 1, it is difficult to have the stopper engage with the teeth on the outer circumference of the pulley while the pulley is rotating.

The art disclosed in patent document 3 relates to inserting an engagement member to the opening of a sheave at a stopped state so as to reliably prevent the sheave from moving, but for example, in order to engage an engagement member to the sheave during rotation, the impact caused when the engagement member contacts the sheave may damage the engagement member, a member retaining the engagement member, the sheave or a member retaining the sheave, and since the diameter of the opening of the sheave is greater than the diameter of the engagement member, it is substantially difficult to retain the sheave in the static state.

The vertical injection molding machine where the mold is opened and closed in the vertical direction has a mold open/close mechanism for moving a movable mold up and down with respect to a fixed mold, an injection drive unit capable of up-down movement which is moved downward when injecting and filling molten resin to a cavity of the mold, and an injection unit capable of up-down movement which is equipped with the injection drive unit and lowered when performing nozzle touch, wherein since these components fall by their own weight when the operation of the vertical injection molding machine is stopped, they may disturb or cause injury of operators and the like during maintenance and checkup of the vertical injection molding machine.

SUMMARY OF THE INVENTION

The present invention aims at solving the prior art problems mentioned above by providing a vertical injection molding machine, the first object of which is to improve safeness by preventing components movable in the up-down direction from falling by their own weight when the operation of the vertical injection molding machine is stopped, and the second object of which is to reliably stop an injection drive unit constituting an injection screw and prevent the same from falling when the vertical injection molding machine is stopped or when a drive transmission mechanism such as a drive transmission belt is damaged during operation of the vertical injection molding machine, to thereby relieve the impact caused when the injection drive unit is stopped.

The present invention provides a vertical injection molding machine having a mold clamping unit that opens and closes a mold in a vertical direction, and an injection unit for injecting molten resin to a cavity of the closed mold, the machine having, an injection drive unit formed to the injection unit, an electric servomotor as a drive source of the injection drive unit, a drive transmission belt to which a drive force of the electric servomotor is transmitted, a driven pulley on which the drive transmission belt is rotated, and a drive transmission unit for moving the injection drive unit having an injection screw up and down in the vertical direction along with the rotation of the driven pulley; wherein the driven pulley has an arc groove formed along a circumferential direction thereof, a pin is provided to be inserted to the arc groove of the driven pulley when the drive transmission belt is disconnected or the electric servomotor is stopped, the arc groove has an inclined portion on a bottom surface formed in the circumferential direction of the driven pulley and having a groove depth becoming shallower along a direction opposite to a direction of rotation of the driven pulley, the pin is projected via an elastic member by an elastic force of the elastic member, and when the pin is projected and inserted to the arc groove, a tip portion of the pin applies pressure on the inclined portion by the elastic force of the elastic member to decelerate the rotational speed of the driven pulley, and by having an inner wall surface of the arc groove on the decelerated driven pulley colliding against the pin, the injection drive unit moved up and down in the vertical direction along with the rotation of the driven pulley via the drive transmission unit is stopped.

The present invention further provides a vertical injection molding machine having, a sensing means for detecting that the drive transmission belt is disconnected or that the electric servomotor is stopped, a mug clamp for retaining the pin in a retracted state using magnetic force; and a controlling means for activating the mug clamp to unclamp the pin retained via the mug clamp and projecting and inserting the pin to the arc groove when the sensing means detects that the drive transmission belt is disconnected or the electric servomotor is stopped.

The invention further provides a vertical injection molding machine having a mold clamping unit that opens and closes a mold in a vertical direction, and an injection unit for injecting molten resin to a cavity of the closed mold, the machine having, an injection drive unit formed to the injection unit, an electric servomotor as a drive source of the injection drive unit, a drive transmission belt to which a drive force of the electric servomotor is transmitted, a driven pulley on which the drive transmission belt is rotated, a drive transmission unit for moving the injection drive unit having an injection screw up and down in the vertical direction along with the rotation of the driven pulley, an electric servomotor for up-down movement of the injection unit driven as a drive source when moving the injection unit up and down, a drive transmission belt for up-down movement of the injection unit to which the drive force of the electric servomotor for moving the injection unit up and down is transmitted, a driven pulley for up-down movement of the injection unit on which the drive transmission belt for moving the injection unit up and down is rotated; a drive transmission unit for up-down movement of the injection unit for moving the injection unit up and down along with a rotation of the driven pulley for up-down movement of the injection unit; an electric servomotor for up-down movement of a mold clamping unit which is driven as a drive source when opening and closing the mold in the vertical direction, a drive transmission belt for up-down movement of the mold clamping unit to which the drive force of the electric servomotor for moving the mold clamping unit up and down is transmitted, a driven pulley for up-down movement of the mold clamping unit on which the drive transmission belt for up-down movement of the mold clamping unit is rotated, and a drive transmission unit for up-down movement of a mold clamping unit for moving a movable die plate on which the mold formed on the mold clamping unit is attached up and down along with the rotation of the driven pulley for moving the mold clamping unit up and down, wherein arc grooves are formed to each of the driven pulley, the driven pulley for moving the injection unit up and down, and the driven pulley for moving the mold clamping unit up and down, and pins to be inserted to each of the arc grooves are disposed retractably.

DETAILED DESCRIPTION OF THE PREFERRED EMBODIMENTS

Figure 1:
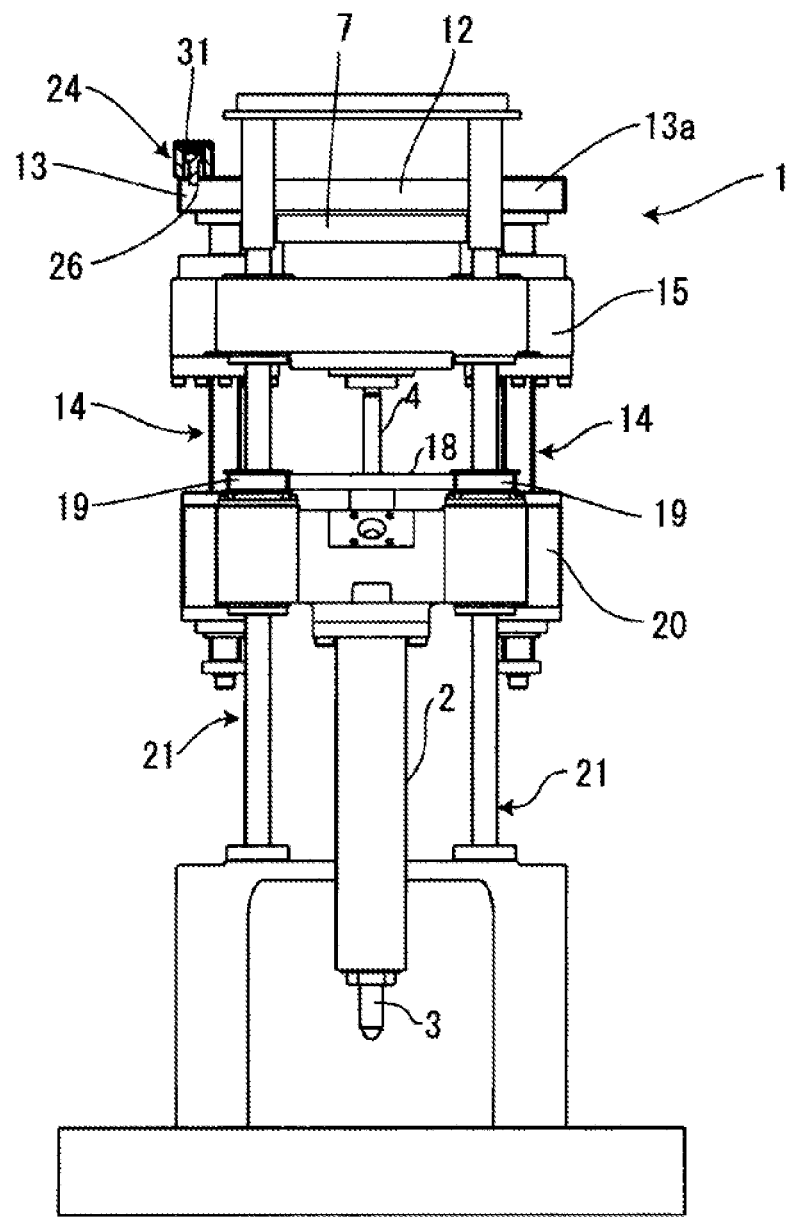
FIG. 1 is a front view of an injection unit formed on a vertical injection molding machine according to embodiment 1, showing a state where an injection drive unit is elevated.
Figure 2:
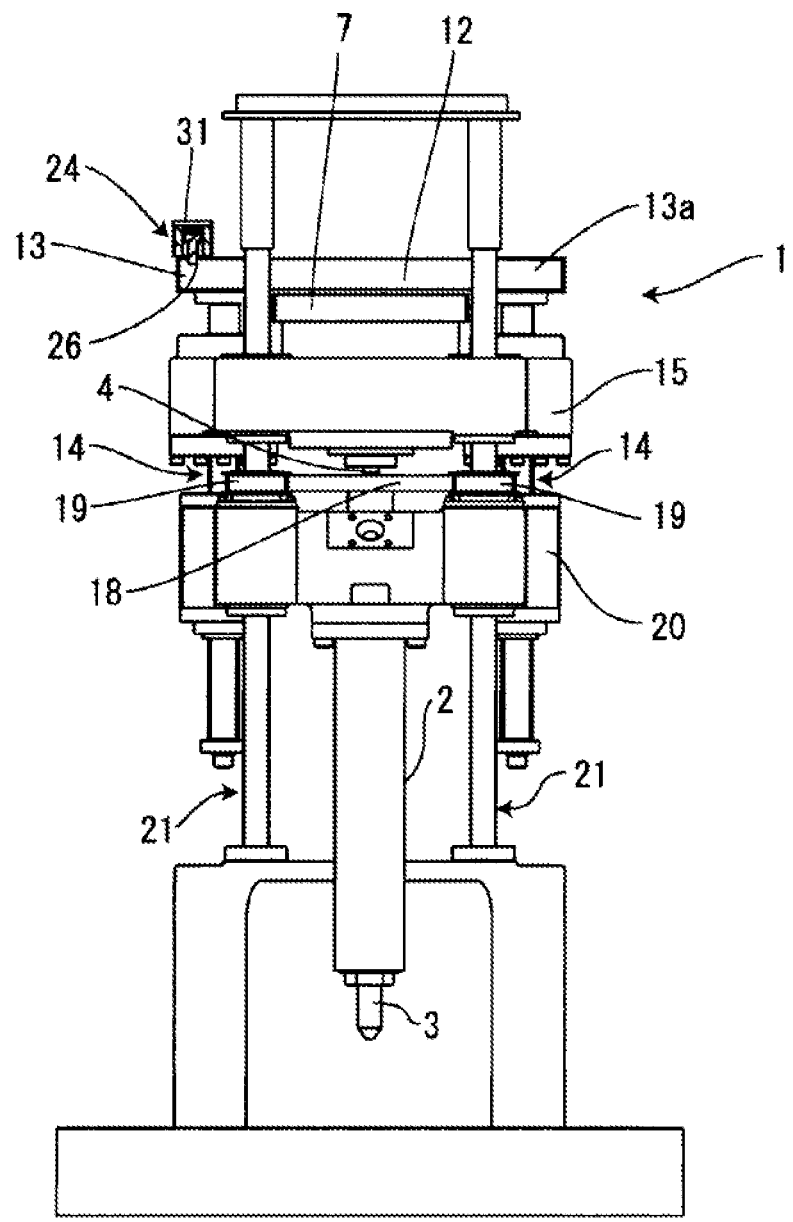
FIG. 2 is a front view of the injection unit formed on the vertical injection molding machine according to embodiment 1, showing a state where the injection drive unit is lowered.

Now, the preferred embodiments for carrying out the present invention will be described hereafter with reference to FIGS. 1 through 14. Of course, the present invention is easily applicable to arrangements within the scope of the present invention other than those described in the present description of embodiments.

Embodiment 1

A vertical injection molding machine according to a first embodiment of the present invention is broadly composed of an injection unit 1 for injecting and filling molten resin to a cavity of a mold, and a mold clamping unit (not shown) for opening and closing the mold, wherein the injection unit 1 includes a heating cylinder 2 for heating and melting a pellet being the material of molding parts, and an injection nozzle 3 screwed onto a tip (lower end) of the cylinder in a removable manner.

An injection screw 4 for supplying molten resin to the tip of the injection nozzle 3 is provided in the heating cylinder 2 of the injection unit 1, and during measurement of the molten resin, the injection screw 4 is rotated via first and second rotational pulleys 6 and 7 and a first timing belt 8 with a first electric servomotor 5 functioning as a drive source, by which molten resin is supplied to the tip of the injection nozzle 3.

When injecting the measured molten resin from the tin of the injection nozzle 3, a second electric servomotor 10 functions as the drive source, and this drive force is transmitted to a main driving pulley 11 mounted on a rotation axis of the second electric servomotor 10, a second timing belt 12 which is a drive transmission belt rotated on the main driving pulley 11, and driven pulleys 13 and 13a on which the second timing belt 12 is rotated, wherein the rotational motion of the driven pulleys 13 and 13a are converted into linear motion by a ball screw mechanism 14 functioning as a drive transmission unit to drive an injection drive unit 15 which is capable of up-down movement, and the injection screw 4 fixed rotatably to the injection drive unit 15 is lowered together with the injection drive unit 15 to inject molten resin through the injection nozzle 3.

Further, the up-down movement of the injection unit 1 constituting the injection drive unit 15 utilizes a third electric motor 16 which is an electric servomotor for up-down movement of the injection unit as a drive source, wherein this drive force is transmitted to a main driving pulley 17 for up-down movement attached to a rotation axis of the third electric motor 16, a third timing belt 18 which is a drive transmission belt for up-down movement of the injection unit rotated on the main driving pulley 17 for up-down movement, and a driven pulley 19 which is a driven pulley for up-down movement of the injection unit on which the third timing belt 18 is rotated, wherein the rotational motion of the driven pulley 19 for up-down movement is converted into linear motion via a ball screw mechanism 21 which is a drive transmission unit for up-down movement of the injection unit attached to a heating cylinder mounting bracket 20, so that the up-down movement of the heating cylinder mounting bracket 20 by the above operation causes the injection unit 1 to move up and down.

Figure 3:
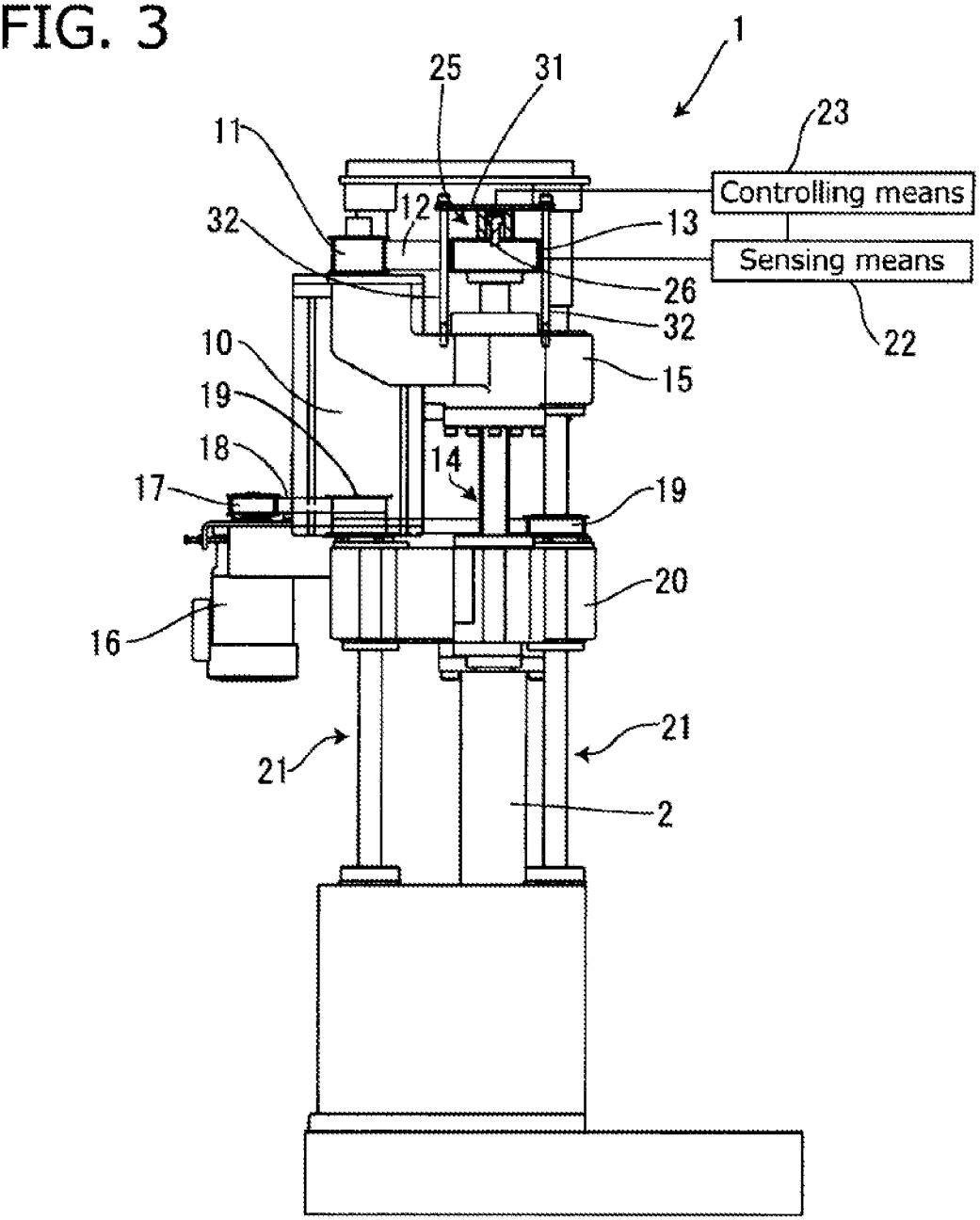
FIG. 3 is a side view of the injection unit formed on the vertical injection molding machine according to embodiment 1, showing a state where the injection drive unit is elevated.
Figure 4:
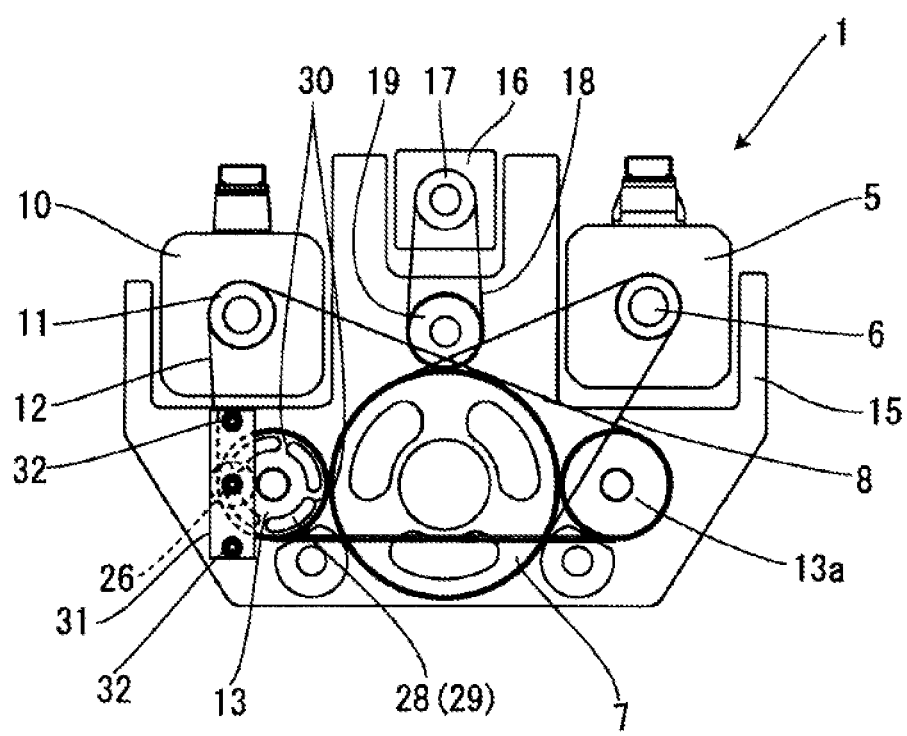
FIG. 4 is a plan view of the injection unit formed on the vertical injection molding machine according to embodiment 1.

As shown in FIGS. 3 and 4, the injection drive unit 15 includes a sensing means 22 for sensing disconnection of the second timing belt 12 or the turning off of power supply to the second electric servomotor 10 and stopping of the second electric servomotor 10, a pin 26 having a spring 25 as an elastic member and ejected by the elastic force of the spring 25, a mug clamp 24 for unclamping the pin 26 clamped in a retracted state via a magnetic force of an electromagnet which is formed for example of a coil 27 and a magnetic material when the sensing means 22 senses that the second timing belt 12 has been disconnected or that the second electric servomotor 10 has been stopped, and a controlling means 23 for controlling the operation of the mug clamp 24.

Figure 6:
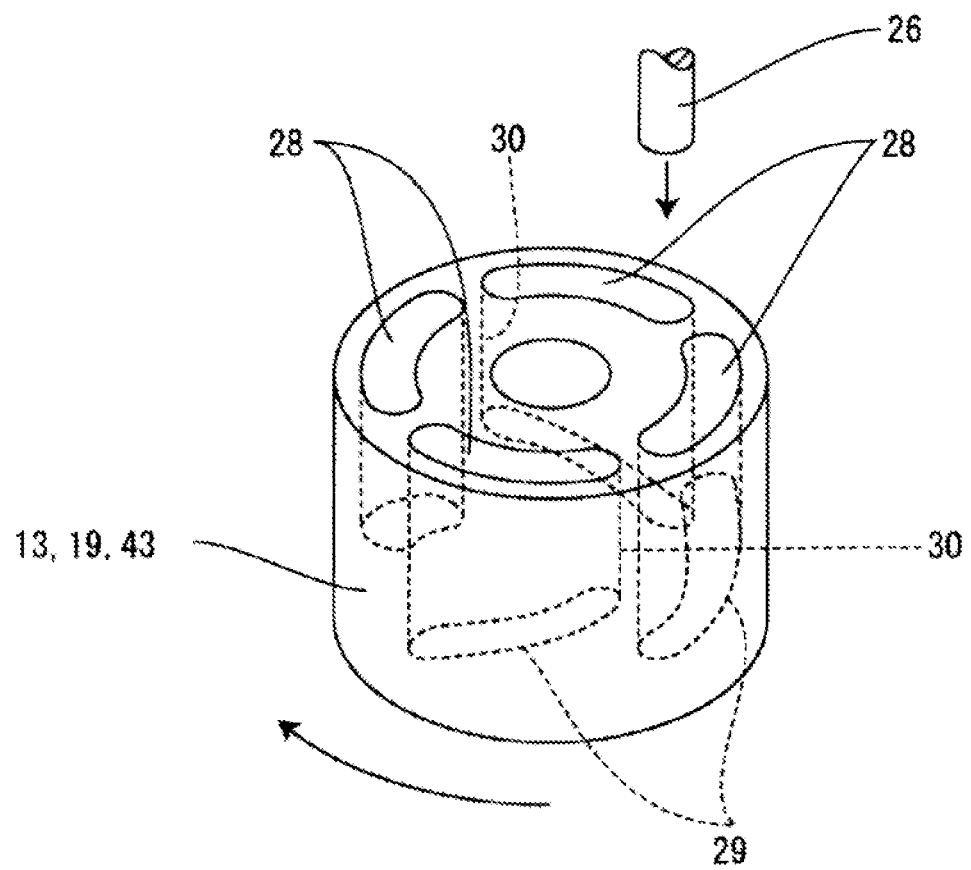
FIG. 6 is a perspective view showing a driven pulley and a pin according to embodiments 1 and 2.

Now, we will describe in further detail one of the driven pulleys 13 to which the arc grooves 28 are formed, with reference to FIG. 6. The driven pulley 13 driven by the second electric servomotor 10 acting as the drive source has four (multiple) arc grooves 28 formed in the circumferential direction of the driven pulley 13, and the pin 26 protruded therefrom is inserted to the arc groove 28 to restrict the rotation of the driven pulley 13.

Further, the driven pulley 13 has formed thereto an inclined portion 29 on which the tip of the pin 26 applies pressure via the elastic force of the spring 25 when the pin 26 is inserted to the arc groove 28. When the vertical injection molding machine is at a stopped state or the like, the pressure applied on the inclined portion 29 by the pin 26 enables to retain the driven pulley 13 at a non-rotated static state.

Moreover, the direction of rotation of the driven pulley 13 is shown by an arrow in FIG. 6. The inclined portion 29 of the arc groove 28 is formed to oppose to the pin 26, as shown in the same drawing, and the inclined portion 29 formed on the bottom side of the arc groove 28 is designed so that the groove depth becomes shallower toward the direction opposite to the direction of rotation of the driven pulley 13 (direction shown by arrow). When it is required to stop the driving operation of the screw 4 (injection drive unit 15) of the injection unit 1 immediately with the second timing belt 12 disconnected, or when the power supply to the second electric servomotor 10 is turned off, the controlling means 23 causes the pin 26 to be projected and inserted to the arc groove 28, wherein if the driven pulley 13 is rotating, the tip of the pin 26 is caused to slide with respect to the inclined portion 29 by the rotation of the driven pulley 13, and the slide resistance causes the rotation speed of the driven pulley 13 to be decelerated promptly. In other words, this operation enables to decelerate the driven pulley 13 rotated to lower the injection drive unit 15 or the injection screw 4 disposed on the injection drive unit 15, and after the deceleration, the driven pulley 13 can be stopped by having an inner wall surface 30 at the end of the arc groove 28 collide against the pin 26. Therefore, the driven pulley 13 can be decelerated and then stopped when the second timing belt 12 is disconnected or the second electric servomotor 10 is stopped, so that the injection drive unit 15 or the injection screw 4 of the injection drive unit 15 operated along with the rotation of the driven pulley 13 can be prevented reliably from falling by their own weight, and the application of a strong impact on the member retaining the pin 26 or the injection drive unit 15 can be prevented.

Figure 7:
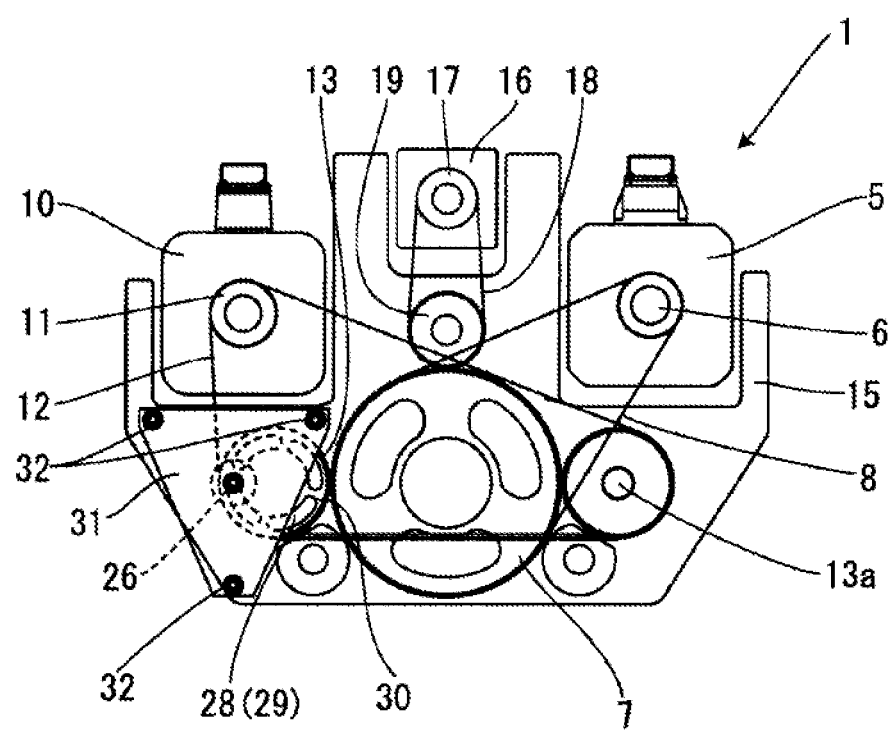
FIG. 7 is a plan view showing an injection unit according to modified example 1.
Figure 8:
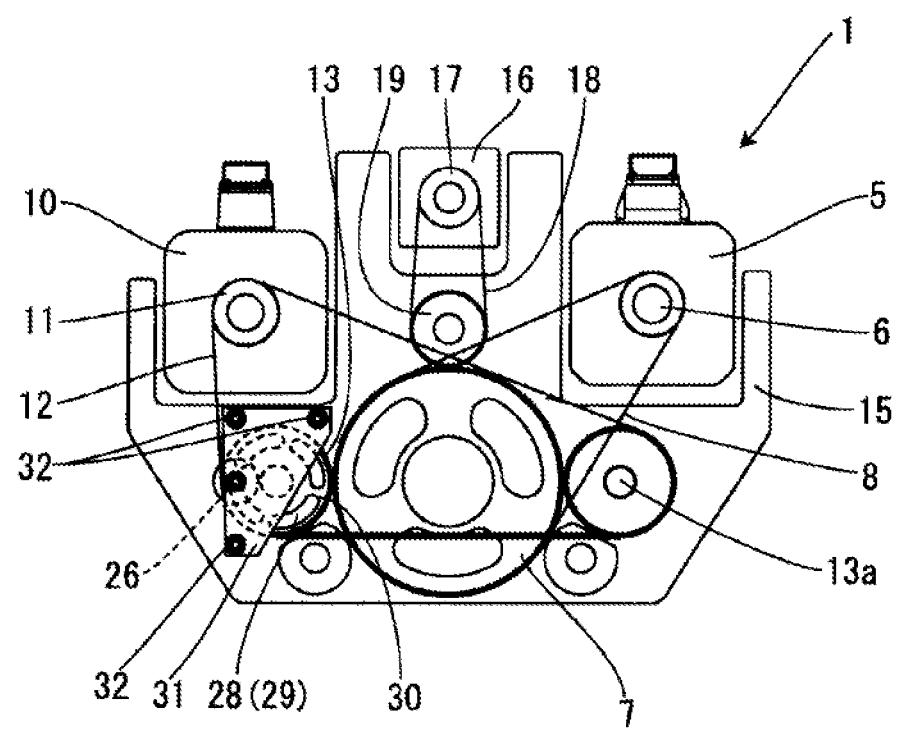
FIG. 8 is a plan view showing the injection unit according to modified example 2.
Figure 9:
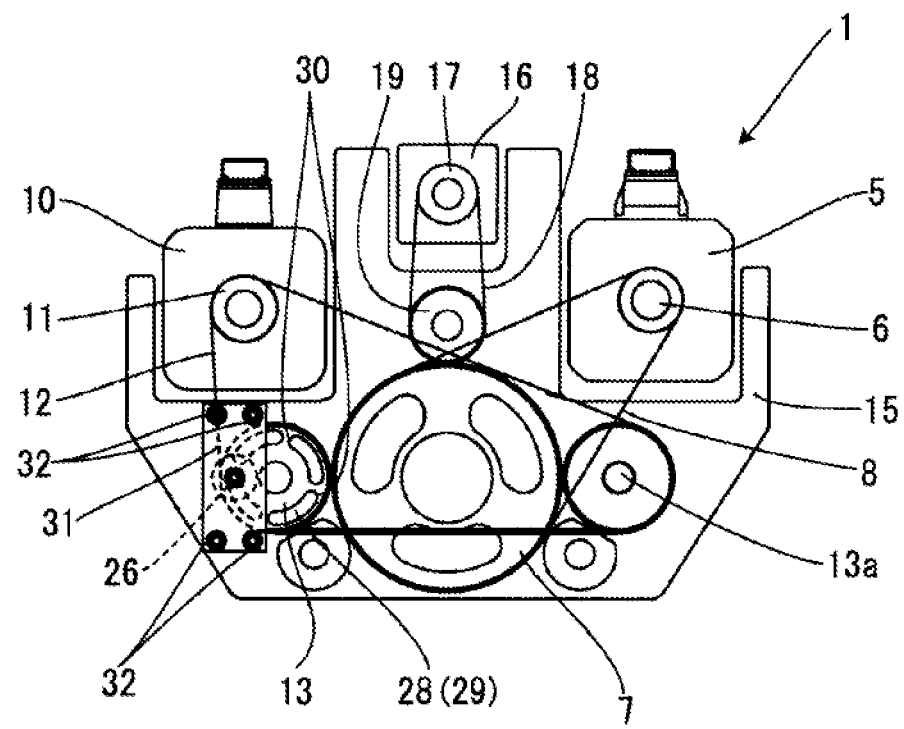
FIG. 9 is a plan view showing an injection unit according to modified example 3.

As shown in FIG. 4, the present embodiment adopts an arrangement where a rectangular retention plate 31 retaining the pin 26 is arranged in a tangential direction of the round driven pulley 13 to which arc grooves 28 are formed, the pin 26 being arranged at the center of the retention plate 31 and having the ends of the retention plate 31 secured to the injection drive unit 15 via bolts 32. It is also possible to adopt a triangular shaped retention plate 31 as shown in FIGS. 7 and 8, or to secure the ends of the retention plate 31 via multiple bolts 32 as shown in FIG. 9, or to arrange the pin 26 along one side of the triangular-shaped retention plate 31 so as to relieve the shock applied on the retention plate 31 when the rotation of the driven pulley 13 is stopped via the pin 26, that is, when the injection drive unit 15 having the injection screw 4 is prevented from falling due to its own weight.

As described, the vertical injection molding machine illustrated in embodiment 1 includes a driven pulley 13 having arc grooves 28 formed in the circumferential direction thereof, a sensing means 22 for detecting that the second timing belt 12 has been disconnected or that the second electric servomotor 10 has been stopped, a pin 26 inserted to the arc groove 28 of the driven pulley 13 when the sensing means 22 detects that the second timing belt 12 has been disconnected or the second electric servomotor 10 has been stopped, and a mug clamp 24 having a coil 27, a magnetic material and the like for clamping the pin 26 in the retracted state using the magnetic force of the electromagnet, wherein the sensing means 22 is equipped with a controlling means 23 for operating the mug clamp 24 to unclamp the pin 26 retained by the mug clamp 24 and having the pin 26 project toward and inserted to the arc groove 28 when it is detected that the second timing belt 12 has been disconnected or the second electric servomotor 10 has been stopped, the arc grooves 28 of the driven pulley 13 having an inclined portion 29 formed on the bottom surface thereof so that the groove depth becomes shallower toward the direction opposite to the direction of rotation of the driven pulley 13 along the circumferential direction of the driven pulley, the pin 26 having a spring 25 as an elastic member and being protruded by the elastic force of the spring 25, wherein when the pin 26 is protruded and inserted to the arc groove 28, the tip of the pin 26 is caused to apply pressure on the inclined portion 29 by the elastic force of the spring 25 so that the rotation speed of the driven pulley 13 is decelerated, and the inner wall surface 30 of the arc groove 28 of the decelerated driven pulley 13 is collided against the pin 26 and the pin 26 prevents the driven pulley 13 from rotating to thereby stop the injection drive unit 15. According to this arrangement, when disconnection of the second timing belt 12 or the stopping of operation of the vertical injection molding machine in which the second electric servomotor 10 has stopped occurs, the injection drive unit 15 or the injection screw 4 disposed on the injection drive unit 15 can be prevented from falling, so that a vertical injection molding machine having superior safeness can be achieved. Further, the impact caused when the injection drive unit 15 or the driven pulley 13 is stopped can be relieved by the elastic force of the pin 26 via the spring 25 according to the present embodiment, so that the application of a strong force on a retention member directly or indirectly retaining the injection drive unit 15 and causing damage to the device can be prevented.

Embodiment 2

Next, a second embodiment of a vertical injection molding machine according to one example of the present invention will be described with reference to FIGS. 10 through 14. The vertical injection molding machine according to embodiment 2 has almost all the components of the vertical injection molding machine according to embodiment 1 described previously, so the equivalent components as embodiment 1 are denoted with the same reference numbers, and detailed descriptions thereof are omitted. Further, a driven pulley 19 for up-down movement which is a driven pulley for driving the injection unit 1 up and down and a driven pulley 43 for driving a mold clamping unit up and down have substantially the same configuration as the driven pulley 13 illustrated in FIG. 8, so that detailed description of the pulleys 19 and 43 are omitted, and only the differences will be described below.

Figure 10:
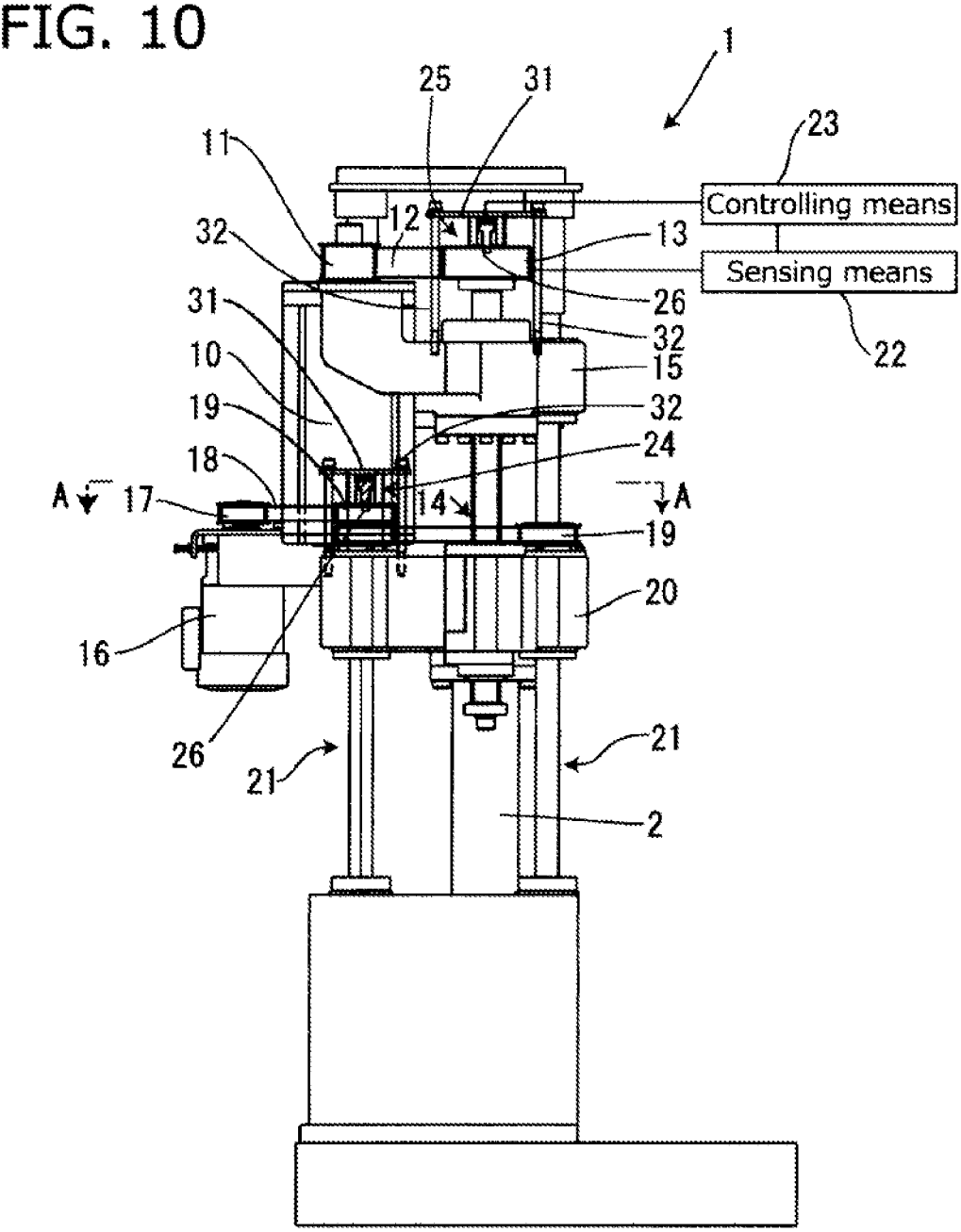
FIG. 10 is a side view of an injection unit formed on the vertical injection molding machine according to embodiment 2, showing a state where the injection drive unit is elevated.
Figure 11:
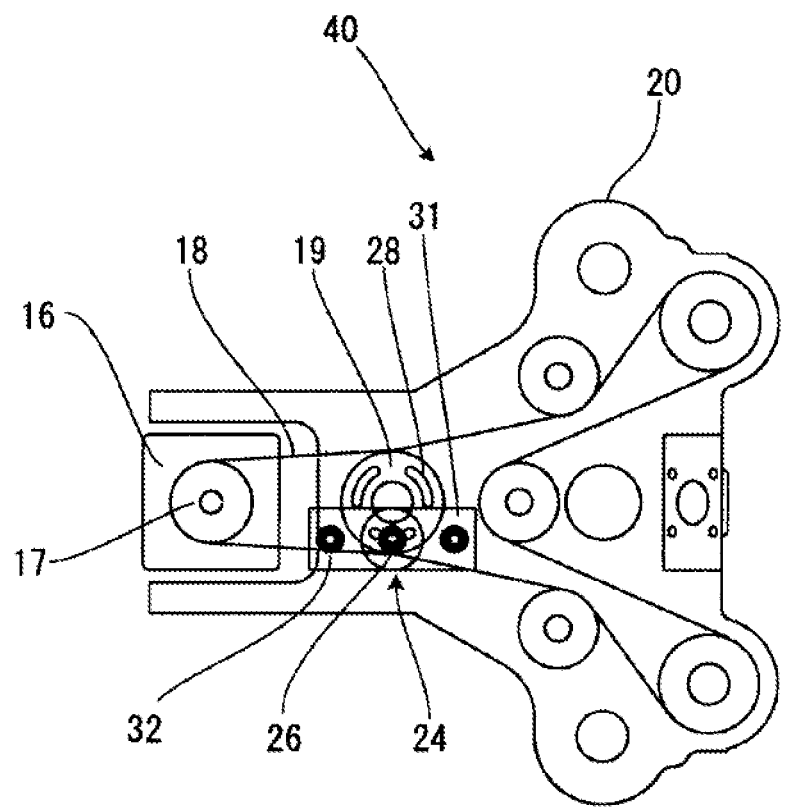
FIG. 11 is a perspective view cut out at line A-A of FIG. 10.

According to the vertical injection molding machine of embodiment 2, as shown in FIGS. 10 and 11, the driven pulley 19 for driving the injection unit 1 up and down has three (multiple) arc grooves 28 formed along the circumferential direction of the driven pulley 19 for up-down movement, and a retractable pin 26 is disposed so that it can be inserted to the arc groove 28.

Figure 12:
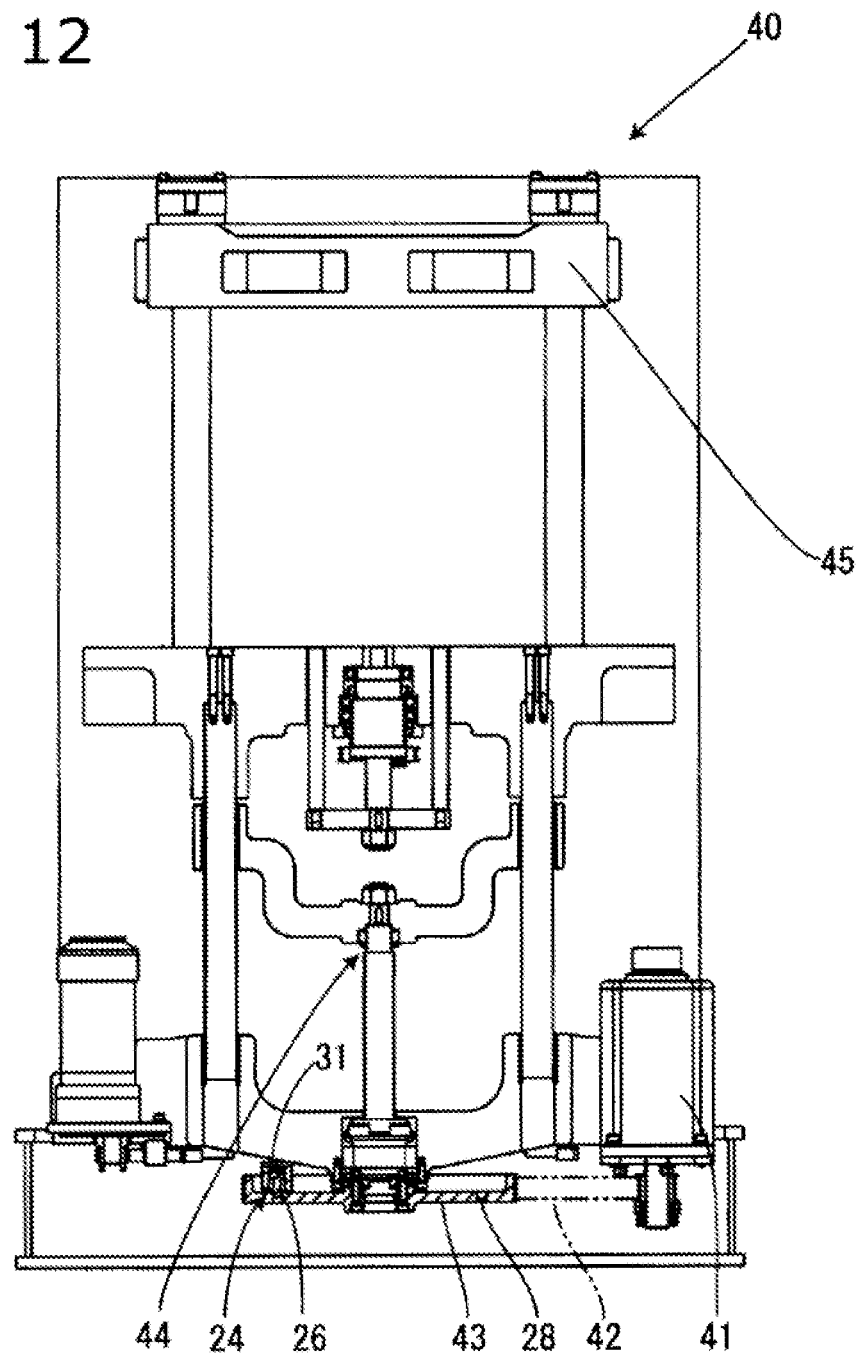
FIG. 12 is a front view showing a mold clamping unit disposed below the injection unit according to embodiment 2.
Figure 13:
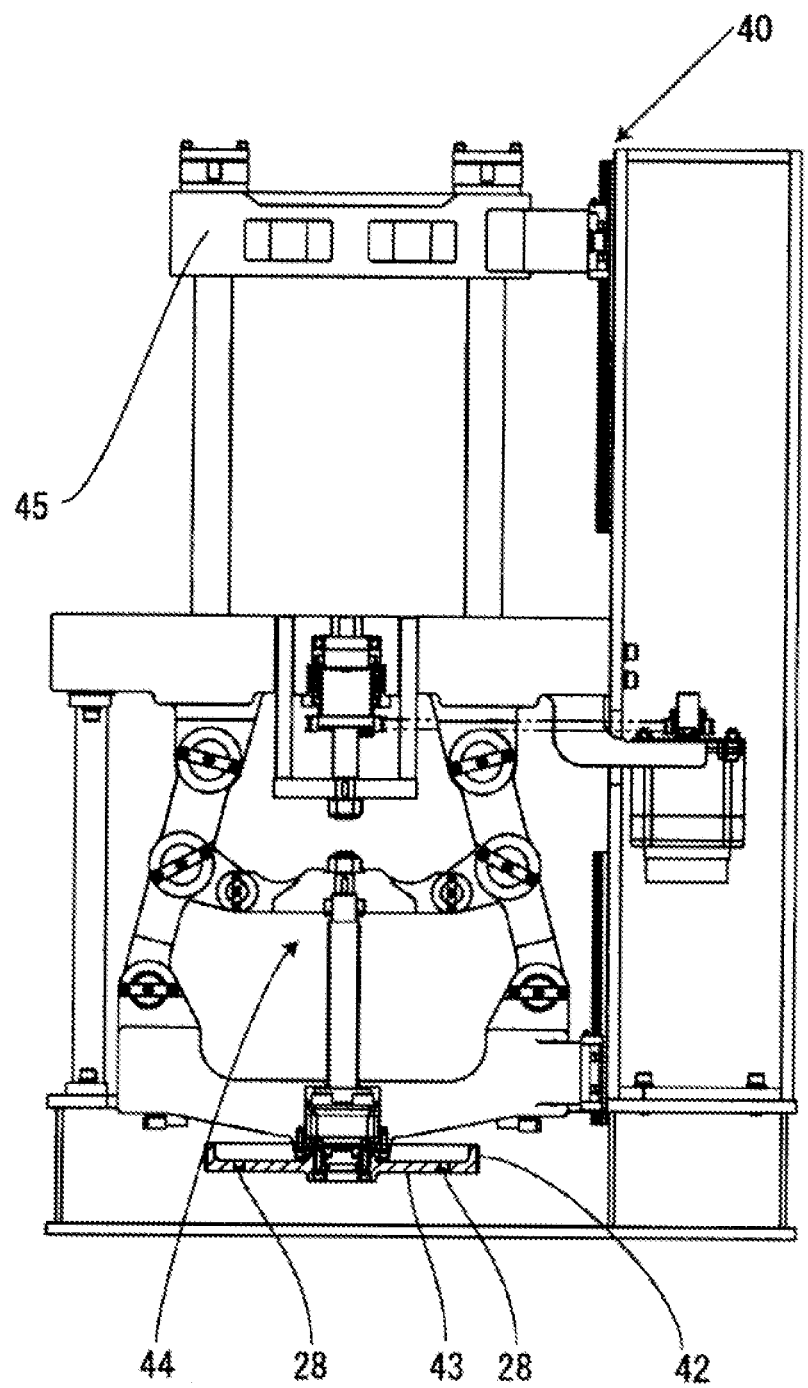
FIG. 13 is a side view showing a mold clamping unit disposed below the injection unit according to embodiment 2.
Figure 14:
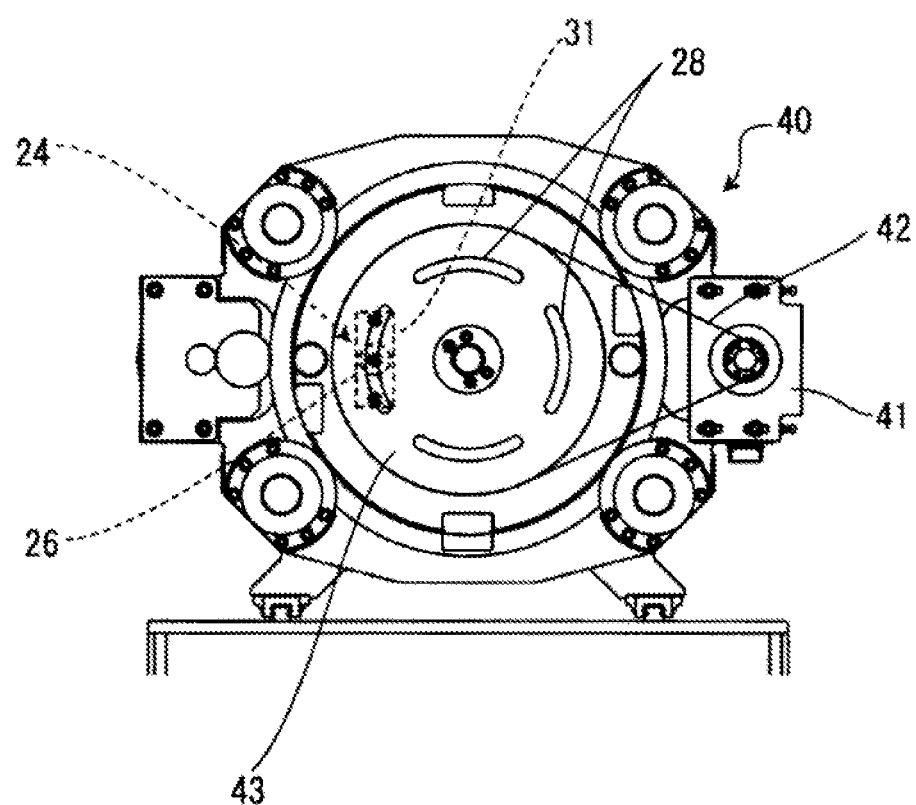
FIG. 14 is a bottom view showing the mold clamping unit disposed below the injection unit according to embodiment 2.

A mold clamping unit 40 shown in FIGS. 12 through 14 is attached integrally to a bottom portion of the injection unit 1, and as shown in the drawings, the mold clamping unit 40 has an electric servomotor 41 for up-down movement of the mold clamping unit which is driven as a drive source when opening and closing the mold in the vertical direction, a drive transmission belt 42 for up-down movement of the mold clamping unit to which the drive force of an electric servomotor 41 for up-down movement of the mold clamping unit is transmitted, a driven pulley 43 for up-down movement of the mold clamping unit on which a drive transmission belt 42 for up-down movement of the mold clamping unit is rotated, a toggle link mechanism 44 which is a drive transmission unit for up-down movement of the mold clamping unit which can extend or shrink in the vertical direction along with the rotation of the driven pulley 43 for up-down movement of the mold clamping unit, and a movable die plate 45 having a movable mold (not shown) attached thereto and being moved up and down by the operation of the toggle link mechanism 44.

As shown in FIG. 14, the driven pulley 43 for up-down movement of the mold clamping unit 40 has multiple (four) arc grooves 28 formed along the circumferential direction thereof, and a retractable pin 26 is disposed so that it can be inserted to the arc groove 28.

When the pins 26 disposed to correspond respectively to the arc grooves formed to the driven pulley 13, the driven pulley 19 for up-down movement of the injection unit and the driven pulley 43 for up-down movement of the mold clamping unit are moved forward and inserted to the arc groove, the rotation of the pulleys 13, 19 and 43 can be prevented reliably when the operation of the vertical injection molding machine is at a stopped state or the like. By preventing the rotation of the driven pulley 13, the driven pulley 19 for up-down movement and the driven pulley 43 for up-down movement of the mold clamping unit, it becomes possible to reliably prevent the injection drive unit 15, the injection screw 4, the injection unit 1, the toggle link mechanism 44 and the movable die plate 45 having a mold attached thereto which are moved downward in cooperation with the pulleys 13, 19 and 43 from falling by their own weight.

Figure 5:
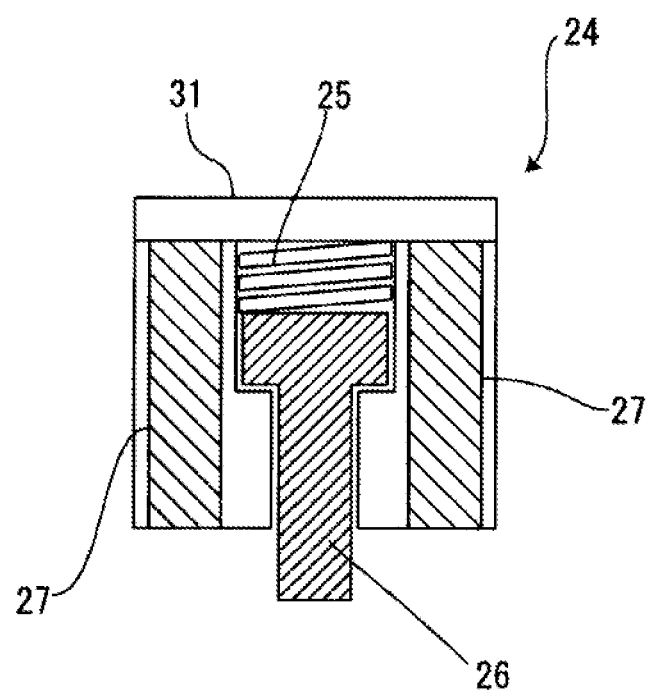
FIG. 5 is a cross-sectional view showing a mug clamp and a pin formed on the injection unit of embodiment 1 and embodiment 2.

The respective pins 26 according to embodiment 2 are designed to project via a spring 25 functioning as an elastic member by the elastic force of the spring 25, as shown in FIG. 5, wherein when the sensing means 22 detects that the timing belt 12, 18 or 42 is disconnected, that any of the motors 10, 16 or 41 is stopped, or that the operation of the vertical injection molding machine has been stopped, the controlling means 23 performs operation control of the mug clamp 24 and unclamps the pin 26 clamped in a retracted state by the magnetic force of the electromagnet composed of a coil 27, a magnetic material and the like, so that the respective pins 26 are moved forward and the pins 26 are respectively inserted to the arc grooves 28 of the corresponding pulleys 13, 19 and 43.

The vertical injection molding machine according to embodiment 2 comprises an injection drive unit 15 and a second electric servomotor 10 functioning as a drive source of the injection drive unit 15 formed in an injection unit 1, a second timing belt 12 which is a drive transmission belt to which the drive force of the second electric servomotor 10 is transmitted, a driven pulley 13 on which the second timing belt 12 is rotated, a ball screw mechanism 14 which is a drive transmission unit for moving the injection drive unit 15 to which an injection screw 4 is disposed up and down in the vertical direction along with the rotation of the driven pulley 13, a third electric motor 16 which is an electric servomotor as a drive source for moving the injection unit 1 up and down, a third timing belt 18 which is a drive transmission belt for moving the injection unit up and down to which the drive force from the third electric motor 16 is transmitted, a driven pulley 19 for up-down movement on which the third timing belt 18 is rotated, a ball screw mechanism 21 as a drive transmission unit for moving the injection unit 1 up and down along with the rotation of the driven pulley 19 for up-down movement, an electric servomotor 41 for moving a mold clamping unit up and down which is driven as a drive source for opening and closing the mold in the vertical direction, a drive transmission belt 42 for moving the mold clamping unit up and down to which the drive force from the electric servomotor 41 for moving the mold clamping unit up and down is transmitted, a driven pulley 43 for moving the mold clamping unit up and down on which a drive transmission belt 42 for moving the mold clamping unit up and down is rotated, and a toggle link mechanism 44 which is a drive transmission unit for moving the mold clamping unit up and down which moves a movable die plate 45 having the mold formed on the mold clamping unit 40 attached thereto up and down along with the rotation of the driven pulley 43 for moving the mold clamping unit up and down, wherein arc grooves 28 are formed respectively to the driven pulley 13, the driven pulley 19 for moving the injection unit up and down, and the driven pulley 43 for moving the mold clamping unit up and down, with retractable pins 26 disposed to be inserted to each of the arc grooves 28. According to this arrangement, when the operation of the vertical injection molding machine is stopped, for example, the pins 26 are projected toward and inserted to the arc grooves 28 of the driven pulleys 13, 19 and 43 so that the injection drive unit 15 or the injection screw 4 formed on the injection drive unit 15 can be prevented from falling, the pin 26 is projected toward and inserted to the arc groove 28 of the driven pulley 19 for up-down movement so that the injection unit 1 can be prevented from falling, and the pin 26 is projected toward and inserted to the arc groove 28 of the driven pulley 43 for moving the mold clamping unit up and down so that the movable die plate 45 on which the mold is attached or the toggle link mechanism 44 can be prevented from falling. In other words, it becomes possible to prevent specific members capable of moving up and down in the vertical injection molding machine from falling by their own weight, so that a vertical injection molding machine having superior safeness can be obtained.

According to the invention of the present vertical injection molding machine, the injection drive unit or the injection screw provided on the injection drive unit can be prevented from falling when the drive transmission belt is disconnected or when the electric servomotor is stopped, so that a vertical injection molding machine having superior safeness can be obtained. Moreover, since the elastic force of the pin via an elastic member can relieve the shock that occurs when the injection drive unit is stopped, it becomes possible to prevent strong force which may cause the device to break from being applied on a retention member retaining the injection drive unit or the like.

According to the present invention related to vertical injection molding machines, when the operation of the vertical injection molding machine is stopped, an pin is projected toward and inserted to an arc groove formed on a driven pulley to prevent the injection drive unit or the injection screw provided on the injection drive unit from falling, an pin is projected toward and inserted to an arc groove formed on a driven pulley for allowing the injection unit to move up and down to prevent the injection unit from falling, and a pin is projected toward and inserted to an arc groove formed on a driven pulley for allowing the mold clamping unit to move up and down to prevent a movable die plate on which the mold is attached or a drive transmission member for driving the mold clamping unit to move up and down from falling. In other words, the present invention enables to prevent components movably disposed in the up-down direction on the vertical injection molding machine from falling by their own weight, so that a vertical injection molding machine having superior safeness can be obtained.

What is claimed is:

1. A vertical injection molding machine having a mold clamping unit that opens and closes a mold in a vertical direction, and an injection unit for injecting molten resin to a cavity of the mold when in a closed position; the machine comprising:
    an injection drive unit formed to the injection unit;
    an electric servomotor as a drive source of the injection drive unit;
    a drive transmission belt to which a drive force of the electric servomotor is transmitted;
    a driven pulley on which the drive transmission belt is rotated; and
    a drive transmission unit for moving the injection drive unit having an injection screw up and down in the vertical direction along with the rotation of the driven pulley;
wherein
    the driven pulley has an arc groove formed along a circumferential direction thereof;
    a pin is provided to be inserted to the arc groove of the driven pulley when the drive transmission belt is disconnected or the electric servomotor is stopped;
    the arc groove has an inclined portion on a bottom surface formed in the circumferential direction of the driven pulley and having a groove depth becoming shallower along a direction opposite to a direction of rotation of the driven pulley;
    the pin is projected via an elastic member by an elastic force of the elastic member; and
    when the pin is projected and inserted in the arc groove, a tip portion of the pin applies pressure on the inclined portion by the elastic force of the elastic member to decelerate the rotational speed of the driven pulley, and by having an inner wall surface of the arc groove on the decelerated driven pulley collide against the pin, the movement of the injection drive unit up and down in the vertical direction along with the rotation of the driven pulley via the drive transmission unit is stopped.

2. The vertical injection molding machine according to claim 1, further comprising:
    a sensing means for detecting that the drive transmission belt is disconnected or that the electric servomotor is stopped;
    a mug clamp for retaining the pin in a retracted state using magnetic force; and
    a controlling means for activating the mug clamp to unclamp the pin retained via the mug clamp and projecting and inserting the pin to the arc groove when the sensing means detects that the drive transmission belt is disconnected or the electric servomotor is stopped.

3. A vertical injection molding machine having a mold clamping unit that opens and closes a mold in a vertical direction, and an injection unit for injecting molten resin to a cavity of the mold when in a closed position; the machine comprising:
    an injection drive unit formed to the injection unit;
    an electric servomotor as a drive source of the injection drive unit;
    a drive transmission belt to which a drive force of the electric servomotor is transmitted;
    a driven pulley on which the drive transmission belt is rotated;
    a drive transmission unit for moving the injection drive unit having an injection screw up and down in the vertical direction along with the rotation of the driven pulley;
    an electric servomotor for providing up-down movement of the injection unit, the electric servomotor for providing up-down movement of the injection unit being driven as a drive source when moving the injection unit up and down;
    a drive transmission belt for providing up-down movement of the injection unit, the drive force of the electric servomotor for providing up-down movement of the injection unit being transmitted to the drive transmission belt for providing up-down movement of the injection unit;

a driven pulley for providing up-down movement of the injection unit, the drive transmission belt for providing up-down movement of the injection unit being rotated on the driven pulley for providing up-down movement of the injection unit;

a drive transmission unit for providing up-down movement of the injection unit for moving the injection unit up and down along with a rotation of the driven pulley for up-down movement of the injection unit;

an electric servomotor for providing up-down movement of a mold clamping unit which is driven as a drive source when opening and closing the mold in the vertical direction;

a drive transmission belt for providing up-down movement of the mold clamping unit to which the drive force of the electric servomotor for moving the mold clamping unit up and down is transmitted;

a driven pulley for providing up-down movement of the mold clamping unit on which the drive transmission belt for up-down movement of the mold clamping unit is rotated; and a drive transmission unit for providing up-down movement of a mold clamping unit for moving a movable die plate on which the mold formed on the mold clamping unit is attached up and down along with the rotation of the driven pulley for moving the mold clamping unit up and down;

wherein arc grooves are formed to each of the driven pulley, the driven pulley for moving the injection unit up and down, and the driven pulley for moving the mold clamping unit up and down; and pins to be inserted to each of the arc grooves, said pins being retractably disposed.

* * * * *